United States Patent [19]

Mori

[11] Patent Number: 4,892,380
[45] Date of Patent: Jan. 9, 1990

[54] OPTICAL CONNECTOR

[76] Inventor: Kei Mori, 3-16-3-501, Kaminoge, Setagaya-ku, Tokyo, Japan

[21] Appl. No.: 286,402

[22] Filed: Dec. 16, 1988

[30] Foreign Application Priority Data

Apr. 20, 1988 [JP] Japan .................................. 63-98767

[51] Int. Cl.⁴ .............................................. G02B 6/36
[52] U.S. Cl. .................................................. 350/96.21
[58] Field of Search ................. 350/96.20, 96.21, 96.22

[56] References Cited

U.S. PATENT DOCUMENTS

| | | | |
|---|---|---|---|
| 4,118,105 | 9/1978 | Voigt | 350/96.20 |
| 4,285,572 | 8/1981 | Beaudette et al. | 350/96.20 |
| 4,435,036 | 3/1984 | Sasakawa | 350/96.20 |
| 4,607,911 | 8/1986 | Rhodes | 350/96.20 |
| 4,650,276 | 3/1987 | Lanzisera et al. | 350/96.20 |
| 4,717,234 | 1/1988 | Barlow et al. | 350/96.21 |

*Primary Examiner*—William L. Sikes
*Assistant Examiner*—Akm E. Ullah
*Attorney, Agent, or Firm*—Jordan and Hamburg

[57] ABSTRACT

An optical connector comprises a first cap-nut-shaped connecting member having an internally threaded socket with a flat bottom to threadably engage with the threaded protective tube end of the first optic cable, a second bolt-shaped connecting member having a bore there-through and threadably engaged with the first cap-nut-shaped connecting member, a third connecting member and a fourth connecting member loosely inserted in the through-bore of the second bolt-shaped connecting member and having a flange at its opposite sides for threadably engaging with the threaded tube end of the second optic cable member. The end-surfaces of the fiber optic cable member and the second optic cable member are arranged opposite to each other. The third member's flange being caught between the second connecting member's bottom surface and the first connecting member's socket bottom surface. And the fourth connecting member being screwed onto the protected tube-end of the second optic cable member to form a light-guiding passage.

1 Claim, 3 Drawing Sheets

OPTICAL CONNECTOR

BACKGROUND OF THE INVENTION

The present invention relates to the construction of an optical connector for connecting two optic cables to each other.

Since an optic conductor with a transmission loss of 20 dB/km was developed, the optic conductor has been remarkably advanced not only in the field of communications but also in the various fields of its application such as measurements, information processing, energy transmission etc. Optical cable is comprised of a light transmitting fibers made chiefly of quartz, which are not only far superior to any conventional metal transmitting circuit in the quality of the information transmitted but are also able to provide many advantages such as high tensile strength, high flexibility, easy maintenance and simplicity of application. Furthermore, there are abundant materials available for making optical fibers. All the above-mentioned advantages will facilitate the further development of further applications. A typical optical fiber comprises a quartz core of 100 to 150 μm in diameter surrounded by a clad chiefly made of quartz, a reflective index which is less than those of the core and more than that of air.

Since the tensile strength of the clad is extremely affected by any mechanical damage, its surface is protected with a urethane or some other polymer film covering of about 10 μm in thickness and is further covered with an outer covering of nylon resin or the like. The optical fiber thus formed is called an optical fiber core. Each core has an outer diameter of about 0.9 mm and is reinforced with a material for increasing tensile strength as well as another outer covering of about 3 mm in diameter. The above-mentioned optical fibers are available as spacer-cables for use in multiplex communications, underground cables etc.

In the case of cables the chief problem is to secure a correct connection of the fiber optic cables. Usually, in practice, a cable-splicing method is adopted for permanently connecting the optical fibers but it is inadequate in cases where a fiber optic cable is used between transmitting and receiving devices or is connected to any component of fiber optics such as light switches, light couplers etc.

In such cases an optical connector for connecting the fiber optic cables must be used. The requirements for connecting mishaps by the optical connector are not as serious as compared with those in splicing since the connector is seldom used on communication lines. It is basically important that the optical connector have high reliability in connecting and mechanical strength since it is frequently used for connecting and disconnecting. More specifically, it is necessary to make the connector compact, easy-to-use and suitable for mass production.

In view of the foregoing, two types of optical fiber connectors, namely, adjustable and non-adjustable ones, have been developed. The former is a connector which can be adjusted so as to minimize the connection loss, for instance, by turning an eccentric sleeve to align the optical fiber ends to each other. Such an adjustment is performed by monitoring the light transmission through the fibers until the maximum value is obtained.

The latter is a connector, wherein optical fiber ends are guided by a metal cylinder of an accurate diameter so as to mechanically align them to each other.

Concerning the connection of optical fiber, as for example for use in communications, many and various kinds of optical connectors were developed and used in the past. However, optical connectors for connecting fiber optic cables having a quantity of optical fibers for light-energy transmission, due to small demand for them, had hardly been proposed. Of course, the above-mentioned optical connectors for communications could be used for such a purpose but they had to be precisely finished for assuring an accurate alignment and connection of quantities of very fine optic fibers. The cost could be prohibitive.

The applicant previously proposed that solar rays be collected by a lens system, introduced into a fiber optic cable and transmitted anywhere they were needed as for illumination, solar bathing or for other various purposes.

In each case, the solar rays transmitted via optical fibers could be most effectively utilized if various kinds of terminal devices could be selectively used, according to the different applications, by removably connecting the fiber optic cable ends to them. In the past, optical connectors for doing the above were not provided.

SUMMARY OF THE INVENTION

In view of the foregoing, it is the main object of this invention to provide an optical connector which can connect an optic cable's end removably and interchangeably to various kinds of terminal devices to transmit the solar energy thereto.

More specifically, it is the object of this invention to provide an optical connector of small size, which is mechanically simple and inexpensive to manufacture.

DESCRIPTION OF THE PREFERRED EMBODIMENTS

Figure 1:
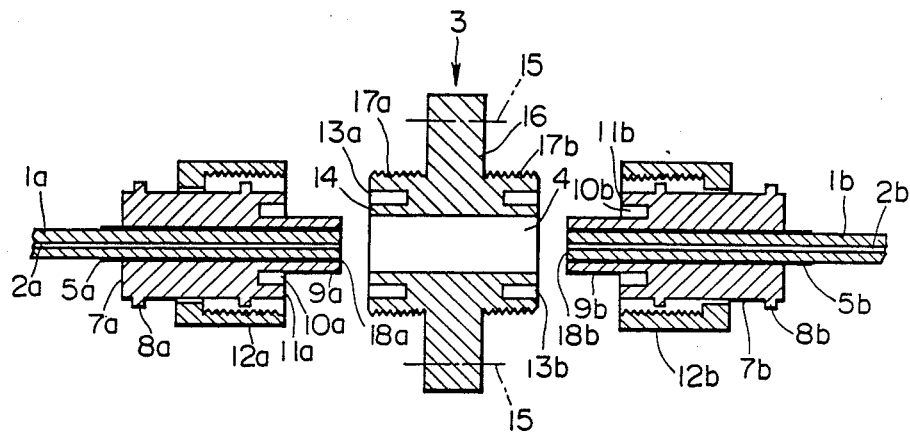
FIG. 1 shows an example of conventional optical connector of the non-adjustable type.

FIG. 1 shows a sectional view of an example of the non-adjustable type optical connector (as dis-assembled) for connecting optical fibers 2a, 2b fitted with optical fiber members 1a and 1b. In FIG. 1, 7a is a first-sleeve which is constructed symmetrically to a second-sleeve 7b and integrally connected with a guide 3. Each optical fiber's end is coaxially fitted into a protective metal cylinders 5a, 5b, adhesively bonded thereto and ground at its end-surfaces 18a, 18b. Cylinder-shaped sleeves 7a and 7b allow optical fibers 1a and 1b respectively to pass there-through and to be fixed therein. Each sleeve, having a pair of spaced circumferential stop rings 8a, 8b respectively, is fitted with a cap nuts 12a, 12b which are slide there-along between two stop rings to be threadably connected with the guide 3. Each sleeve also has an inserting column portions 9a, 9b respectively accommodating an optical fiber core 1a or 1b at it's end surfaces 18a, 18b respectively and a ring-grooved portions 10a, 10b around the column portions respectively. Consequently, a sleeve cylinder portion, 11a, 11b are also formed around said ring-grooved portion, 10a, 10b respectively. On the other hand, the guide 3 is used for joining the sleeve 7a with the sleeve 7b and has a through-bore 4 for fitting the inserting columns of said sleeves thereinto from both sides. Furthermore, the guide 3 has cylindrical portions 10a, 10b and ring socket portions 13a, 13b at its opposite ends for engaging with the corresponding ring-grooved portions 10a, 10b respectively and cylinder portions 11a, 11b of the sleeves when the column portions 9a, 9b are inserted into the guide. When the first sleeve 7a and the second sleeve 7b are inserted into the guide 3 respectively from the right and left sides, the optical fibers 2a, 2b are coaxially brought together and matched to each other without any necessary adjustments.

Then, cap nuts 12a, 12b are screwed respectively onto the corresponding threaded portions 17a, 17b of the guide 3 to integrally connect the members. A mounting plate 16 has mounting bolt-holes for fixing to a construction and is used according to the particular application.

As mentioned above, concerning the connection of optical fiber, as for example for use in communications, many and various kinds of optical connectors were developed and used in the past. However, optical connectors for connecting fiber optic cables having a quantity of optical fibers for light-energy transmission, due to small demand for them, had hardly been proposed. Of course, the above-mentioned optical connectors for communications could be used for such a purpose but they had to be precisely finished for assuring an accurate alignment and connection of quantities of very fine optic fibers. The cost could be prohibitive.

The applicant previously proposed that solar rays be collected by a lens system, introduced into a optic cable and transmitted anywhere they were needed as for illumination, solar bathing or for other various purposes.

In each case, the solar rays transmitted via optic fiber cable could be most effectively utilized if various kinds of terminal devices could be selectively used, according to the different applications, by removably connecting the fiber optic cable ends to them. In the past, optical connectors for doing the above were not provided.

Figure 2:
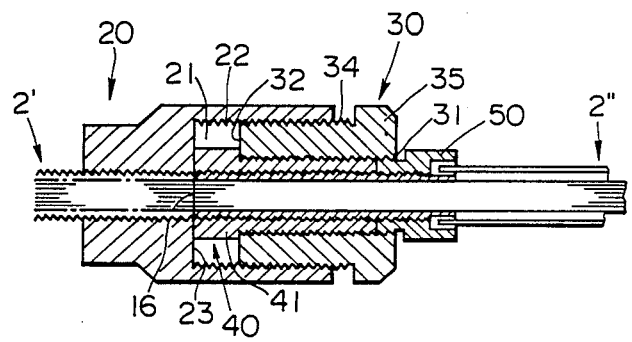
FIG. 2 shows sectional side views of an optical connector according to the present invention as assembled.
Figure 3:
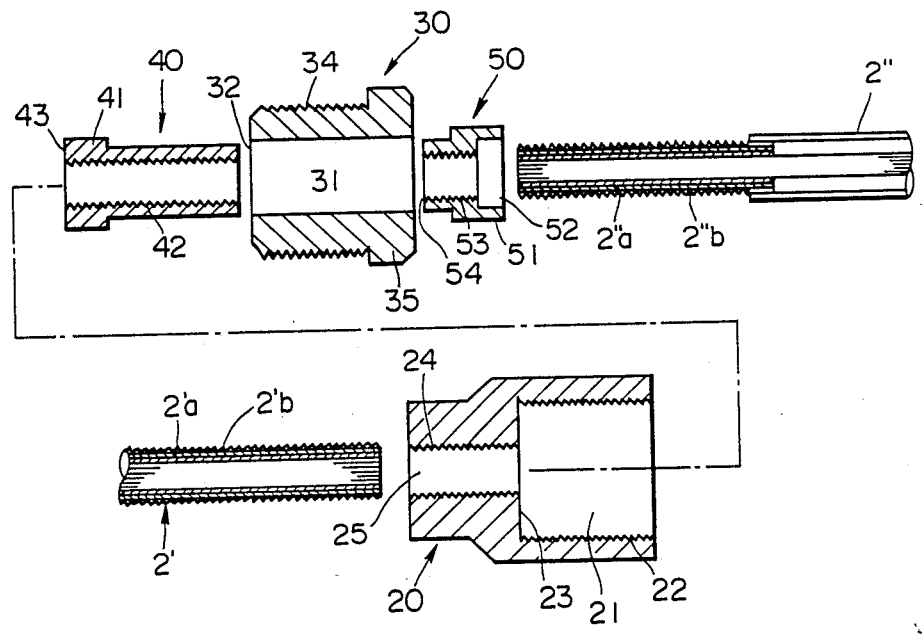
FIG. 3 shows sectional side views of the optical connector according to the present invention as dis-assembled.

FIG. 2 shows sectional view for explaining an embodiment of the present invention as assembled;

FIG. 3 shows sectional view for explaining an embodiment of the present invention as dis-assembled.

In FIGS. 2, and 3, 2' and 2" are optic fiber cables and 20 is a first connecting member. The member 20 is a bowl-shaped member having a concave socket portion 21 with an internal thread 22 therein and a flat bottomed surface 25 and a through bore 25 with an internal thread 24 therein being coaxially joined with the concave portion. The first fiber optic cable member comprising a protective tube member 2'a with a circumferential male thread 2'b which is firmly fitted onto the end of the first fiber optic cable 2' is screwed into the through-bore 25 of the member 20 until the smoothly finished end surface of the fiber optic cable member 2' becomes flush with the bottom plane 23 of the concave portion 21. A bolt-shaped second connecting member 30 has a coaxial bore 31 therethrough, a flanged portion 35 thereon and an external thread 34 for threadably engaging with the internal thread 22 of the first member 20. A third connecting member 40 of a cylindrical shape has a flanged portion 41 and an internally threaded portion 42 and inserted into the through-bore 31 of the second connecting member to threadably engage with the externally threaded portion 2"b of the protecting tube 2"a for the second fiber optic cable member 2".

A fourth connecting member 50 of cylindrical shape has an internally threaded portion 53 for threadably engaging with the second fiber optic cable member 2" and has a flanged portion 51 with a socket for accommodating the protective tube of the fiber optic cable 2".

The above-mentioned four connecting members can be integrally assembled, as shown in FIG. 2 in such a way that the first member, wherein the first fiber optic cable member 2' is threadably secured therein to be flush at its end-surface with the socket-bottom plane 23, and the third member, wherein the second fiber optic cable member 2" is threadably secured therein to be flush at its end-surface with the plane 43, are closely faced to each other and the second member 30 is screwed into the first member 20 to catch the flange 41 of the third member and all of them are locked by the fourth member 50.

As is apparent from the foregoing description, according to the present invention, it is possible to provide a small, simple and inexpensive optical connector since it is composed of only four members 20, 30, 40 and 50 the first member 20 and the second member 30 as well as the third member 40 and the fourth member 50 are threadably engaged to each other in the direction of the axis to reduce the connector's length.

Figure 4:
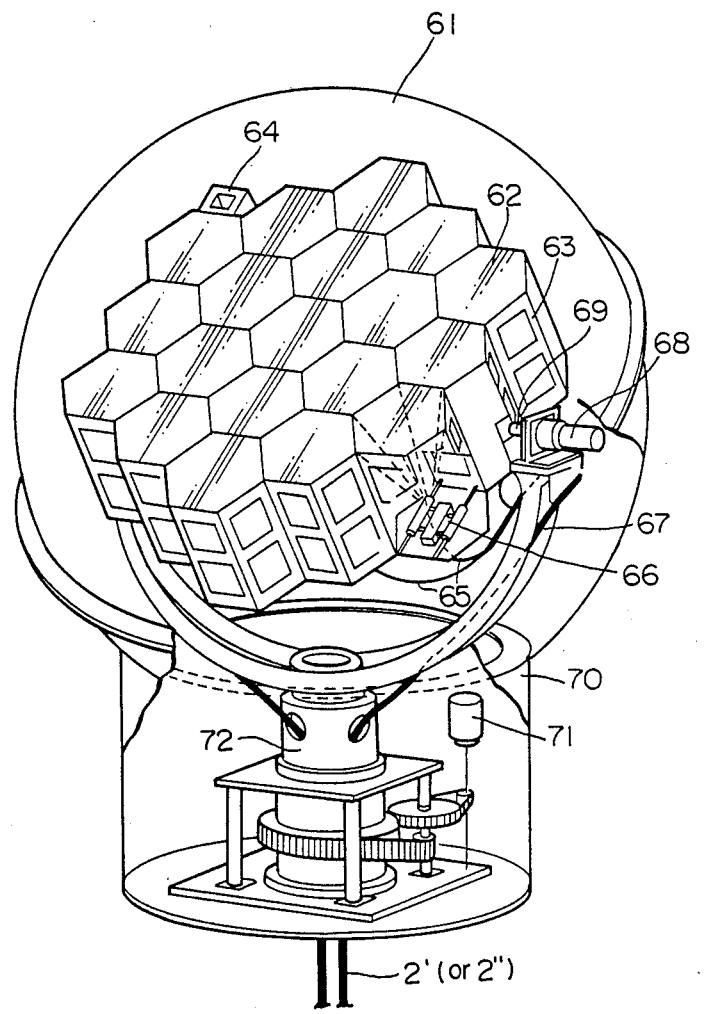
FIG. 4 shows a detailed perspective view for explaining an embodiment of a sun ray collecting device previously proposed by the present applicant.

FIG. 4 shows a detailed perspective view for explaining an embodiment of a sun ray collecting device previously proposed by the present applicant.

In FIG. 4 the reference numeral 61 designates a transparent protective capsule, 62 Fresnel lenses, 63 lens holders, 64 a sun ray direction sensor, 65 optical fibers (or optical conductor cables) each having a light-receiving end placed on the focal position of some Fresnel lenses, 66 fiber holders, 67 an arm, 68 a stepping motor, 69 a horizontal rotatable shaft rotated by the stepping motor 68, 70 a foundation for carrying a protective capsule 61, 72 another stepping motor, and 72 a vertical rotatable shaft rotated by the stepping motor 71, and 2' (or 2") optical conductor cable.

As was already proposed by the present applicant, the above-mentioned sun ray collecting device detects the direction of the sun by use of the sun ray direction-sensor 14 and drives the stepping motors 68 and 71, the horizontal, rotatable shaft 69 and the vertical rotatable shaft 72 according to the detection signal generated by the direction sensor 14 so as to cause the direction sensor 14 to face the sun. In such a way, the sun's rays focused by the respective lenses 12, are guided into each optical fiber 15 through the light-receiving end thereof respectively put on the focal position of each lens. The respective optical fibers of optical conductor cables 15 for each lens are guided from the sun ray collecting device by each fiber or cable. The sun's rays focused by each lens are transmitted onto an optional desired place through optical conductor cable 2', 2" and employed there.

I claim:

1. An optical connector for connecting each other two optic cable members, each of which includes an optic cable end having a smoothly finished surface and firmly secured in a protective tube with an externally-threaded end to be connected, comprising a first cap-nut-shaped connecting member having an internally threaded socket with a flat bottom to threadably engage with the threaded protective tube end of the first optic cable, a second bolt-shaped connecting member having a bore there-through and threadably engaged with said first cap-nut-shaped connecting member, a third connecting member and a fourth connecting member loosely inserted in the through-bore of the second bolt-shaped connecting member and having a flange at its opposite sides for threadably engaging with the threaded tube end of the second optic cable member, characterized in that the end-surfaces of the fiber optic cable member and the second optic cable member are arranged opposite to each other, the third member's flange being caught between the second connecting member's bottom surface and the first connecting member's socket bottom surface and the fourth connecting member being screwed onto the protected tube-end of the second optic cable member to form a light-guiding passage.

* * * * *